No. 613,791. Patented Nov. 8, 1898.
F. BLANDING.
SAFETY DEVICE FOR ELEVATORS.
(Application filed May 21, 1898.)
(No Model.) 2 Sheets—Sheet 1.
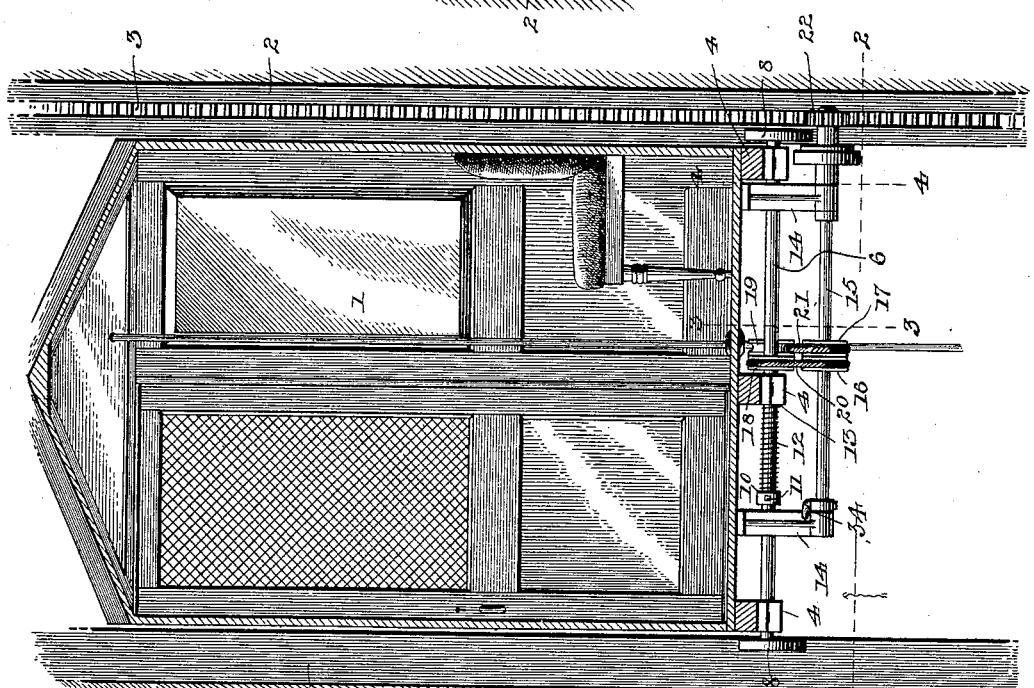

No. 613,791. Patented Nov. 8, 1898.
F. BLANDING.
SAFETY DEVICE FOR ELEVATORS.
(Application filed May 21, 1898.)
(No Model.) 2 Sheets—Sheet 2.
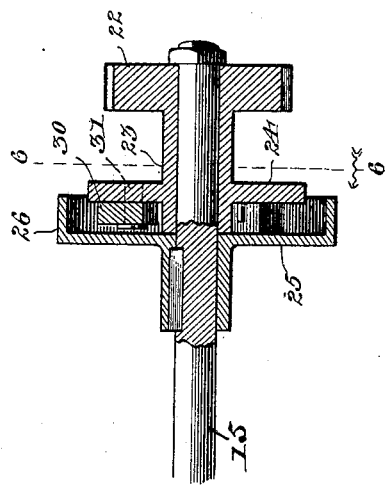
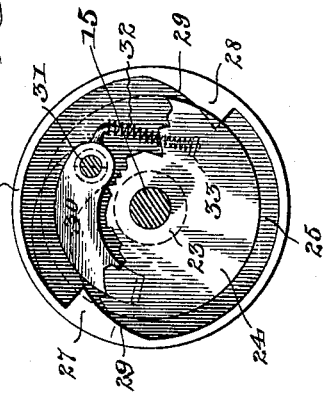
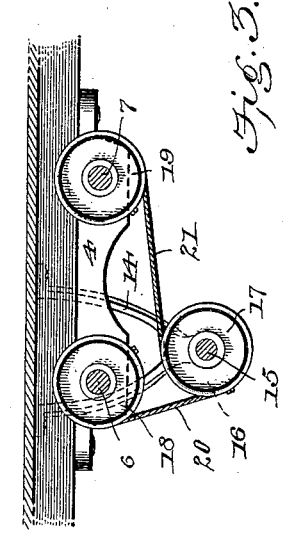
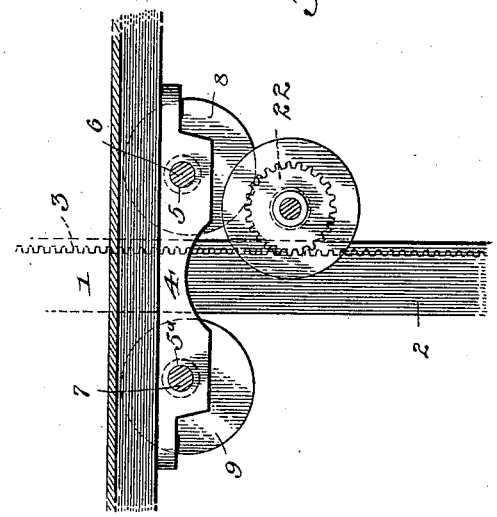
Witnesses
Francis Blanding, Inventor
By his Attorneys,

UNITED STATES PATENT OFFICE.

FRANCIS BLANDING, OF NEW LONDON, CONNECTICUT, ASSIGNOR OF ONE-HALF TO W. S. JOHNSON, OF PUTNAM, CONNECTICUT.

SAFETY DEVICE FOR ELEVATORS.

SPECIFICATION forming part of Letters Patent No. 613,791, dated November 8, 1898.

Application filed May 21, 1898. Serial No. 681,309. (No model.)

*To all whom it may concern:*

Be it known that I, FRANCIS BLANDING, a citizen of the United States, residing at New London, in the county of New London and State of Connecticut, have invented a new and useful Safety Device for Elevators, of which the following is a specification.

My invention relates to improvements in safety devices for elevators; and the primary object that I have in view is to provide mechanism which will be automatically set in operation to firmly grip the elevator-guides should the motion of the cage or car become accelerated, owing to breakage of the hoisting-cable or from any cause whatever, beyond the limit of the speed at which the cage is designed to travel in the elevator-shaft or hatchway.

A further object of the invention is to provide means which will be set positively in action by devices having traveling contact with one of the elevator-guides, and this actuating mechanism is normally free from the gripper mechanism, so as not to actuate the latter on the travel of the cage within the speed limits.

With these ends in view my invention consists in the combination, with elevator-guides, of gripper-shafts journaled on a car and provided with cams arranged to frictionally engage with said guides, a horizontal actuating-shaft situated between the gripper-shafts and having independent operative connections therewith to actuate both gripper-shafts in opposite directions simultaneously, a driving device mounted idly on the actuator-shaft and geared to one of the elevator-guides, and a centrifugal clutch mechanism having one member mounted on the idle driving device and the other member secured firmly to the actuator-shaft.

The invention further consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a sectional elevation illustrating my safety device applied to an ordinary elevator-car. Fig. 2 is a horizontal sectional view on the plane indicated by the dotted line 2 2 of Fig. 1, looking upward against the under side of the cage and in the direction indicated by the arrow. Fig. 3 is a vertical transverse section through the cage and the safety mechanism on the plane indicated by the dotted line 3 3 of Fig. 2. Fig. 4 is a view similar to Fig. 3, but taken on the plane indicated by the dotted line 4 4 of Fig. 2. Fig. 5 is an enlarged detail sectional view through the clutch and driving device, the section being cut longitudinally through a part of the actuating-shaft. Fig. 6 is another enlarged detail section taken on the plane indicated by the dotted line 6 6 of Fig. 5, looking at the working face of the clutch-disk. Fig. 7 is a detail view representing a stop device by which the movement of the cam-shafts in one direction under the influence of the retracting-springs is arrested.

Like numerals of reference denote like and corresponding parts in each of the several figures of the drawings.

1 designates the elevator cage or car, and 2 are the parallel elevator-guides, between which the cage or car is designed to travel. This cage and the guides therefor may be of any construction approved by those skilled in the art, because no novelty therefor is claimed herein, my invention being applicable generally to passenger or freight elevators.

On one of the side faces of one of the elevator-guides is provided a toothed bar constituting a gear-rack 3, with which engages a driving device for the safety mechanism; but this rack takes up but a very small portion of the face of one elevator-guide, so that the guides have smooth faces for the proper binding thereon of the gripper-cams.

To the lower or under side of the cage 1 are secured two or more shaft-bearings 4, each of which is preferably cast in a single piece of metal and formed with journal-openings 5 and 5ª, and these bearings are bolted or otherwise secured solidly to the bottom of the car to have the shaft-openings therein aline with each other. These bearings 4 are quite long and are secured to the bottom of the cage to have the openings 5 and 5ª therein disposed on opposite sides of the vertical plane of the elevator-guides, thus presenting the gripper-shafts in proper relation to the guides for the gripper-cams to bind against the lateral faces of said guides. The gripper-shafts are indicated at 6 and 7 in the drawings, and they are disposed in horizontal positions across the bottom of the car, one gripper-shaft 6 lying on one side of the vertical plane of the elevator-guides, while the other gripper-shaft 7 is on the opposite side of said elevator-guides. The ends of the gripper-shafts project beyond their bearings 4, and to the projecting ends of the gripper-shafts 6 are secured the gripper-cams 8, adapted to bind against the faces of the elevator-guides on one side thereof; but to the protruding ends of the gripper-shaft 7 are secured the gripper-cams 9, which are disposed or presented oppositely to the gripper-cams 8 and are adapted to bind against the other faces of the elevator-guides. Under normal conditions the shafts 6 7 are maintained by retractors in the form of springs in positions where the gripper-cams are free from contact or engagement with the elevator-guides, thus permitting the cage to travel freely within the shaft or hatchway without hindrance from the safety mechanism, and this end is attained in my invention by the employment of the collars 10 and springs 12. The collars are fitted on the gripper-shafts between the bearings thereof, and they are held firmly in place on said shafts by the binding-screws 11. One spring 12 is coiled loosely on each of the gripper-shafts. One end of the spring is securely attached to the collar 10 on said shaft, and the other end of the spring is fastened securely, as at 13, to one of the bearings 4. The spring is placed under tension when the collar is fitted to the shaft, and the tension of the spring is normally exerted against the collar to hold the shaft in a position for the gripper-cam to be free from engagement with the elevator-guide, and as the gripper-cams on the two shafts are set on centers different from those of the shafts the springs 12 are arranged to act in opposite directions on the gripper-shafts, so as to throw the two sets of gripper-cams in opposite directions and away from the lateral faces of the two guides.

14 designates hangers which are rigidly secured to the bottom or the elevator-cage, so as to depend below the gripper-shafts, and these hangers are provided with alined journal-bearings to receive the horizontal actuating-shaft 15, which is arranged in a position between the gripper-shafts and at a suitable distance below the same, or said actuating-shaft may be arranged immediately below one of the gripper-shafts, it being essential that the end of the shaft which protrudes beyond the side of the cage shall be arranged adjacent to the toothed rack 3 on one vertical guide. This actuating-shaft is operatively connected by suitable transmitting devices or gearing with both of the gripper-shafts in a manner to simultaneously rock or turn the latter in opposite directions; but normally the actuating-shaft remains at rest, so that it will not influence the gripper-shaft as long as the speed of the cage is within the desired limit. In the preferred embodiment of the transmitting device or gearing between the actuating and gripping shafts I employ the disks 16 17, which are rigidly secured to the actuating-shaft to rock or turn therewith, and on the gripper-shafts 6 and 7 are secured the disks 18 and 19, respectively. Between the disks 16 of the shaft 15 and the disk 18 on the shaft 6 is arranged a cable or chain 20, and a similar cable or chain 21 is attached to the disks 17 19 on the shafts 15 and 7, respectively. These cables or chains 20 21 are fitted to the disks 18 19 to extend in opposite directions part way around said disks 18 and 19, and when the actuating-shaft is turned in one direction by the driving device, to be presently described, the cables or chains are pulled or strained to turn the gripper-shafts 6 7 in opposite directions simultaneously, thereby causing the gripper-cams to seize opposite faces of the elevator-guides and sustain the cage against falling in the elevator-shaft or hatchway.

To the protruding end of the actuating-shaft 15 is loosely fitted a driving device which remains idle on the shaft during the travel of the cage within the speed limit, and with this driving device is associated a centrifugal clutch mechanism that remains inactive under normal conditions and is only brought into service on an accelerated descent of the cage beyond its speed limit, whereby the driving device and the clutch mechanism are actuated automatically to impel the actuating-shaft, which in turn positively moves the gripper-shafts for the cams thereof to bind tightly against the elevator-guides.

The driving device 22 is embodied, preferably, in the form of a gear or pinion arranged to mesh with the rack 3 to be rotated positively by engagement therewith on the vertical travel of the cage 1, and this rotary pinion is provided with an elongated hub or sleeve, which is fitted loosely on the shaft 15 to rotate freely thereon. At its inner end this hub or sleeve 23 is equipped with a pawl-carrier 24, herein shown as consisting of a disk which is made an integral part of the hub or sleeve, and this pawl-carrier is adjacent to the face of a clutch-disk 25, which is substantially fastened to the actuating-shaft 15 in any approved way. This clutch-disk is fashioned to provide a solid annular rim or flange 26, on the inner face of which are formed the abutments 27 28, which are integral with said flange or rim at diametrically opposite points thereof and are formed to provide the inclined faces 29, over which the nose of the pawl may pass should the pawl be thrown outward in the reverse movement of the actuating-shaft.

The clutch-pawl 30 is loosely hung or pivoted, as at 31, to the face of the pawl-carrier which is presented opposite to the face of the clutch-disk, and this pawl is normally restrained from outward movement by centrifugal action by means of a spring 32, one end of which is attached to the heel of the pawl and its other end fastened to a short lug 33, rigid with the pawl-carrier. The tension of the spring 32 is regulated to restrain the pawl from being thrown outward by centrifugal action on the rotation of the driving-gear as the cage travels within the speed limit; but when the descent of the cage is accelerated to a point beyond the speed limit the increase in the speed of rotation of the gear throws the pawl outward by centrifugal action, which overcomes the tension of the spring and causes its nose to engage with one or the other of the abutments 27 or 28 on the clutch-disk, thereby making the clutch-disk fast with the driving-gear and causing the shaft 15 to be rotated positively for actuating the gripper mechanism.

On the actuating-shaft 15 is secured a dog 34, which is set to gage the backward movement of the gripper-shafts.

The operation may be described, briefly, as follows: The cage is free to travel vertically within the shaft of the hatchway at the proper speed without influencing the gripper mechanism, and the driving-gear is rotated by its engagement with the fixed rack, so as to turn idly on the actuating-shaft, the pawl being held out of the path of the abutments on the clutch-disk by the action of the spring 32. The actuating-shaft thus remains at rest and the springs 12 on the gripper-shafts hold the latter in positions where the gripper-cams are free from engagement with the vertical guides. Should the cage acquire accelerated movement in a downward direction owing to breakage of the hoisting-cable or disorganization of any part of the hoisting mechanism, the driving-gear will be rotated beyond the normal speed and the pawl will be thrown outward by centrifugal force to overcome the resistance of the spring 32. This outward movement of the pawl causes it to become engaged with one of the abutments 27 or 28, and the clutch-disk is thus made fast with the driving-gear to positively rotate with said gear and actuate the shaft 15 in like manner. The rocking or turning of the shaft 15 strains the cables or chains 20 21 to turn the gripper-shafts positively in opposite directions, and thus the gripper-cams are forced firmly into engagement with the vertical guides, whereby the descent of the cage in the shaft or hatchway is arrested. The cage is sustained in its suspended position within the hatchway or elevator-shaft by the safety mechanism while the hoisting appliances for the elevator are repaired, and when the elevator is again in condition for service the cage should be lifted, whereupon the gripper-cams are free to disengage themselves from the vertical guides and the springs return the shafts and cams to their normal positions, the clutch-pawl being automatically disengaged from the clutch-disk.

I am aware that changes in the form and proportion of parts and in the details of construction may be made by a skilled mechanic without departing from the spirit or sacrificing the advantages of the invention, and I therefore reserve the right to make such modifications as fall within the scope of the invention.

It will be understood that the coiled springs on the cam-shafts serve to normally hold these shafts in positions where the short radii of the cams are opposite to the elevator-guides, and to prevent the shafts from moving too far under the action of the springs I have provided the stop device 34. This consists of a collar having a clamping-screw and an offstanding arm, and this collar is secured to the actuator-shaft in a position for the offstanding arm to engage with one of the hangers. It will be understood that an excessive speed in the descent of the cage actuates the safety mechanism and causes the cams to seize the elevator-guides; but when the cage is started upwardly the clutch disengages itself from the actuator-shaft, and the cam and actuator-shafts are moved backward under the recoil of the springs, all of said shafts being coupled together as desired. The turning or rocking of the shafts under the action of the springs is prevented from progressing too far or causing the cams to interfere with the upward travel of the cage by the stop 34 coming in contact with the shaft-bearing of one hanger for the actuator-shaft.

Having thus described the invention, what I claim is—

1. In a safety device for elevators, the combination with elevator-guides, of gripper-shafts journaled on a car and provided with cams arranged to frictionally engage with said guides, the horizontal actuating-shaft situated between the gripper-shafts and having independent operative connections therewith to actuate both gripper-shafts in opposite directions simultaneously, a driving device mounted idly on the actuator-shaft and geared to one of the elevator-guides, and a centrifugal clutch mechanism having one member mounted on the idle driving device and the other member secured firmly to the actuator-shaft, substantially as described.

2. In a safety device for elevators, a centrifugal clutch mechanism comprising a gear having a plate or disk, a flanged disk provided with abutments or shoulders, and a pawl hung on the first-named disk or plate and adapted to be moved by centrifugal force into engagement with an abutment of the flanged disk, combined with the gripper-shafts, an actuator-shaft on which the gear and flanged disks are loosely mounted and fixed, respectively, and operative connections between the actuator-shaft and the gripper-shafts, substantially as described.

3. In a safety device for elevators, the combination of gripper-shafts provided with gripper-cams, retractors for holding the gripper-cams normally free from elevator-guides, an actuating-shaft connected with both gripper-shafts to turn the latter simultaneously in opposite directions, and a clutch-controlled driving device for positively actuating said shaft, substantially as described.

4. In a safety device for elevators, the combination of the shaft-bearings adapted to be fixed to a cage, the gripper-shafts journaled in said bearings and held against spreading thereby, the gripper-cams attached to the gripper-shafts, retracting-springs operatively connected with the gripper-shafts to normally hold the cams thereon free from the elevator-guides, an actuating-shaft connected with the gripper-shafts, and a clutch-controlled driving mechanism, arranged to have traveling contact with an elevator-guide, substantially as described.

5. In a safety device for elevators, the combination of gripper-shafts provided with gripper-cams, an actuating-shaft, disks secured to the gripper-shafts, chains or cables operatively connecting the disks of said gripper-shafts with the actuating-shaft, and a clutch-controlled driving mechanism adapted to have traveling engagement with an elevator-guide, substantially as described.

6. In a safety device for elevators, the combination with a gripper mechanism, of an actuating-shaft operatively connected therewith, an idle driving-gear loosely mounted on the actuating-shaft and arranged to be rotated by contact with an elevator-guide, a clutch-disk rigid with the actuating-shaft, and a centrifugal pawl arranged to rotate with the driving-gear and adapted, on an increase in the speed of the gear, to engage with the clutch-disk, substantially as described.

7. In a safety device for elevators, the combination with a gripper mechanism and an actuating-shaft therefor, of a driving-gear loosely mounted on the actuating-shaft, a pawl carried by the driving-gear, a spring to normally restrain the pawl from outward movement due to the centrifugal action of the driving-gear, and a clutch fixed to the actuating-shaft and adapted to have the centrifugal pawl engage therewith, substantially as described.

8. In a safety device for elevators, the combination with a gripper mechanism and an actuating-shaft therefor, of a fixed rack on an elevator-guide, a driving-gear having its hub loosely mounted on the actuating-shaft and arranged to mesh with said fixed rack, a clutch fixed to the actuating-shaft and provided with abutments, a pawl-carrier fixed to the hub of the driving-gear, a pawl hung on said carrier, and a spring attached to the carrier and the pawl to restrain the latter against outward movement due to centrifugal force on the rotation of the driving-gear and pawl-carrier within a certain speed limit, substantially as described.

9. In an elevator device, the combination with cam-shafts, an actuator-shaft, and a clutch-controlled driving device, of retracting-springs associated with the cam-shafts, and a stop carried by a shaft to arrest the turning movement of all the shafts under the recoil of said springs, substantially as described.

In testimony that I claim the foregoing as my own I have hereto affixed my signature in the presence of two witnesses.

FRANCIS BLANDING.

Witnesses:
FLORENCE G. FREEMAN,
SARAH E. BLANDING.